(12) United States Patent
Gulliksson

(10) Patent No.: US 7,702,688 B2
(45) Date of Patent: Apr. 20, 2010

(54) PREDICTIVE DATA SEARCH

(75) Inventor: Johan Gulliksson, Bjarred (SE)

(73) Assignee: Sony Ericsson Mobile Communications AB, Lund (SE)

( * ) Notice: Subject to any disclaimer, the term of this patent is extended or adjusted under 35 U.S.C. 154(b) by 449 days.

(21) Appl. No.: 11/558,209

(22) Filed: Nov. 9, 2006

(65) Prior Publication Data

US 2007/0299841 A1    Dec. 27, 2007

Related U.S. Application Data

(60) Provisional application No. 60/805,543, filed on Jun. 22, 2006.

(51) Int. Cl.
*G06F 7/00* (2006.01)
(52) U.S. Cl. .................................. 707/771; 715/864
(58) Field of Classification Search .................. None
See application file for complete search history.

(56) References Cited

U.S. PATENT DOCUMENTS

| | | | |
|---|---|---|---|
| 5,682,439 A * | 10/1997 | Beernink et al. | 382/187 |
| 6,557,004 B1 * | 4/2003 | Ben-Shachar et al. | 707/102 |
| 6,829,607 B1 * | 12/2004 | Tafoya et al. | 707/6 |
| 7,007,239 B1 | 2/2006 | Hawkins | |
| 2002/0113827 A1 * | 8/2002 | Perlman et al. | 345/840 |
| 2004/0143569 A1 * | 7/2004 | Gross et al. | 707/3 |
| 2006/0106769 A1 * | 5/2006 | Gibbs | 707/3 |
| 2007/0050728 A1 * | 3/2007 | Vayssiere | 715/780 |

OTHER PUBLICATIONS

PCT Search Report and Written Opinion, Apr. 11, 2007, 12 pages.
Karlson, A.K. et al., "FaThumb: a facet-based interface for mobile search" Conference on Human Factors in Computing Systems, vol. 2, Apr. 2006, pp. 711-720.

* cited by examiner

*Primary Examiner*—Neveen Abel Jalil
*Assistant Examiner*—Vei-Chung Liang
(74) *Attorney, Agent, or Firm*—Harrity & Harrity, LLP

(57) ABSTRACT

A method for searching for data files stored in a mobile device is provided. The method includes accessing a memory including a plurality of data files, wherein each of the data files includes a file information field containing a character string. The method also includes retrieving, directly from the data files, at least a first part of the file information field associated with the data files. The method also includes presenting the at least first part of the file information field via a display. The method also includes determining a first diverging character position among the character strings in the presented at least first part of the file information field associated with each of the data files. The method also includes receiving, via an input device, an input corresponding to at least one symbol. The method also includes comparing the at least one symbol to each of the characters in the first diverging character position. The method also includes presenting, based on a result of the comparing, at least a second part of the file information field associated with select ones of the data files which include a character, in the first diverging character position of the at least first part of the file information field, that matches the at least one symbol.

20 Claims, 5 Drawing Sheets

| Photo Search: | Photo Search: 2 | Photo Search: 2 |
|---|---|---|
| | 2 | 200 |
| Year Quantity | Year Quantity | Year Quantity |
| 1999 (200) | 2003 (1500) | 2003 (1500) |
| 2003 (1500) | 2004 (2500) | 2004 (2500) |
| 2004 (2500) | 2005 (200) | 2005 (200) |
| 2005 (200) | | |
| Fig. 5a | Fig. 5b | Fig. 5c |

| Photo Search: 25 | Photo Search: 255 | Photo Search: 2558 |
|---|---|---|
| 2005 | 2005 5 | 2005 June |
| Months Quantity | Months Quantity | Days |
| Jan (50) | Jan (50) | 1 2 4 6 7 8 |
| Feb (1) | June (100) | 9 14 20 25 30 |
| March (19) | | |
| June (100) | | |
| Dec (30) | | |
| Fig. 5d | Fig. 5e | Fig. 5f |

| Photo Search: 25586 | Photo Search: 255862 |
|---|---|
| 2005 June 6 | 2005 June 6 |
| Time | Time |
| 09:03 | 22:12 |
| 20:00 | |
| 21:20 | |
| 22:12 | |
| Fig. 5g | Fig. 5h |

PREDICTIVE DATA SEARCH

RELATED APPLICATIONS

This application claims priority under 35 U.S.C. §119 based on U.S. Provisional Application Ser. No. 60/805,543, filed Jun. 22, 2006, the disclosure of which is incorporated herein by reference.

TECHNICAL FIELD OF THE INVENTION

The present invention relates to the field of portable devices and, particularly, portable communication devices configured to store data files. More particularly, the present invention relates to a method of searching for such data files, a portable device adapted to search for such data files, as well as a computer program product for performing the method.

DESCRIPTION OF RELATED ART

Portable communication devices are able to store various types of data files, e.g., image files and audio files etc. The data files may be produced by the portable communication device itself, e.g., by means of a camera or a microphone arranged on the portable device for recording an image or recording a sound. In addition, various data files may also be downloaded by means of wire or wireless communication received by the portable communication device from other devices.

Typically, users desire that data files stored in a portable communication device can be managed for different purposes, e.g., for displaying in the case of image files or for playing in the case of audio files etc. Other purposes may, e.g., be renaming, copying, sending, and/or deleting, etc.

Typically, managing a plurality of data files requires a search to identify the file(s) to be managed. Generally, in a stationary personal computer (PC) this is performed under an application program and/or under an operating system such as Windows™. Typically, this search is fairly efficient due to a comparatively large monitor screen (e.g., 15 inches or more) and an enhanced selection function implemented by a computer mouse or similar device used in connection with a stationary PC. This enables a user to view a large number of data files displayed by the large monitor screen, and to move fast for an easy selection among the data files by means of the computer mouse or similar device, for example, by scrolling.

However, managing a plurality of data files in a portable communication device is more cumbersome. A portable device is typically provided with a comparatively small display (e.g., a few inches, such as 3 or fewer inches) and it typically has a reduced selection function e.g., implemented by means of one or more keys providing a more or less stepwise movement of a cursor or similar from one file to another. Hence, a user of the portable device is limited to view a small number of files on the comparatively small display and to move fairly slowly and substantially stepwise among the displayed files.

The efficiency provided by a large monitor screen and the enhanced selection function provided by a computer mouse or similar device enabling a user to move fast and select easily among a large number of displayed data files is consequently lost.

In view of the above, it would be beneficial to provide an efficient search procedure for identifying the data file(s) to be managed in a portable communication device. In particular, it would be beneficial to provide a simple and intuitive search procedure.

SUMMARY OF THE INVENTION

The present invention is directed to providing a user of a portable device with an efficient search procedure for identifying a data file or data files to be managed in a portable device. In particular, the present invention is directed to providing a simple and intuitive search procedure.

Implementations of the present invention provide a portable device with an efficient search procedure for identifying a data file or data files to be managed in a mobile device. In particular, implementations provide a search procedure and system.

One aspect is directed to a method of searching for at least one data file in a portable device. The method may include accessing a memory including a plurality of data files, wherein the data files include file information fields containing a group of characters; retrieving at least a part of a first file information field associated with the data files; presenting the at least part of the first file information field via a display; determining a first diverging character position in the presented at least part of the first file information field; receiving, via an input device, an input corresponding to at least one symbol; comparing the at least one symbol and the first diverging character position; and presenting at least a part of a second file information field associated with at least one of the data files, wherein a character of the second file information field matches the at least one symbol.

According to another aspect, the method also includes repeating the determining, the receiving, the comparing, and the presenting until all positions in a presented file information field have been traversed or the resented file information field corresponds to one file.

According to another aspect, the file information field comprises a date on which a data file was created or filed.

According to another aspect, the at least one symbol comprises a numeral or a letter.

According to another aspect, the first diverging character position comprises a first position in which two or more characters differ.

According to another aspect, the determining the first diverging character position is performed from a left-most position to a right-most position or a right-most position to a left-most position based on an amount of different characters in a left-most diverging character position and a right-most diverging character position.

According to another aspect, the method includes processing the one file.

According to another aspect, the processing comprises displaying an image or a rendering a sound associated with the one file.

According to another aspect, the retrieving comprises accessing the memory residing in a portable device.

According to another aspect, the mobile device is a phone.

According to another aspect, the retrieving comprises accessing the memory via a network.

Yet another aspect is directed to a mobile device comprising: a keypad comprising a plurality of keys, each key corresponding to at least one symbol; a display for presenting information to a user; and logic configured to: access a memory storing a plurality of data files, each data file including a file information field comprising a plurality of characters; retrieve and present at least a part of said file information fields and search for at least one data file in said plurality of data files by: indicate a first diverging character position in the presented part of the file information fields; receive a key input from the user; compare the at least one symbol corresponding to the key input to a first character in said diverging character position; and present at least a part of a first file information field having a character that matches the at least one symbol.

According to another aspect, the logic is further configured to: repeat the retrieving, indicating, receiving, and comparing, and present an ultimate file information field until all positions in the presented ultimate file information field have been traversed or until the presented ultimate file information field corresponds to a single file.

According to another aspect, the file information field comprises a date on which the data file was created or filed.

According to another aspect, the key input corresponds to a plurality of different symbols, each symbol being one of a numeral or a letter.

According to another aspect, the first diverging character position is a first position in which the presented part of the file information fields comprises different information.

According to another aspect, the logic is further configured to indicate the first diverging character position from leftmost to right-most or from right-most to left-most in the presented part of the file information fields based on a number of different symbols in a first diverging position when proceeding from a left-most character or from a right-most character in the presented file information fields.

According to another aspect, the logic is further configured to process an identified file, when all positions in the presented file information fields have been traversed or when the presented file information field corresponds to a single file.

According to another aspect, the logic is further configured to cause a displaying of an image associated with the identified file or a playing of a sound associated with the identified file.

According to another aspect, the memory resides in the mobile device.

According to another aspect, the logic is further configured to access the memory via a network.

According to another aspect, the mobile device is a phone.

A further aspect is directed to a computer readable medium, having thereon: computer program code means, to make a portable device execute, when said program is loaded in a portable device having access to a memory storing a plurality of data files, each data file being provided with a file information field comprising a plurality of characters; a key arrangement comprising a plurality of keys representing at least one symbol; and a display to present results; the execution comprising: presenting at least a part of said file information fields in said plurality of data files to said user; indicating a first diverging character position in the presented part of the file information fields; obtaining a key input from the user; comparing of the at least one symbol represented by the key input and a character in said diverging character position of said file information fields; presentation at least a part of the file information fields having the character that matches a symbol represented by the key input; and repeating the execution until all positions in the presented file information fields have been traversed or until the presented file information field correspond to a single file.

A still further aspect is directed to a computer program comprising instructions to make a mobile device execute; when said instructions are loaded in the mobile device having access to a memory storing a plurality of data files, each being provided with a file information field comprising a character string; a keypad including a plurality of keys representing at least one symbol; and a display for presenting results; the instructions to: present at least a part of the character string in said plurality of data files to said user; signify a first diverging character position in the presented file information fields; obtain a key input from the user; compare the at least one symbol represented by the key input and a character in said diverging character position; present at least a part of the file information fields having the character that matches a symbol represented by the key input; and repeat the above steps until all positions in the presented file information fields have been traversed or until the presented file information field correspond to a single file.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which:

FIG. 5a-h is a number of figures illustrating an exemplifying method of searching for a data file in a portable device.

DETAILED DESCRIPTION OF THE IMPLEMENTATIONS

The present invention relates to portable devices including searchable data products. In particular, the invention relates to portable communication devices comprising searchable data products. However, the invention is by no means limited to communication devices. Rather, it can be applied to any suitable portable device comprising searchable data products, in particularly searchable data files.

Figure 1:
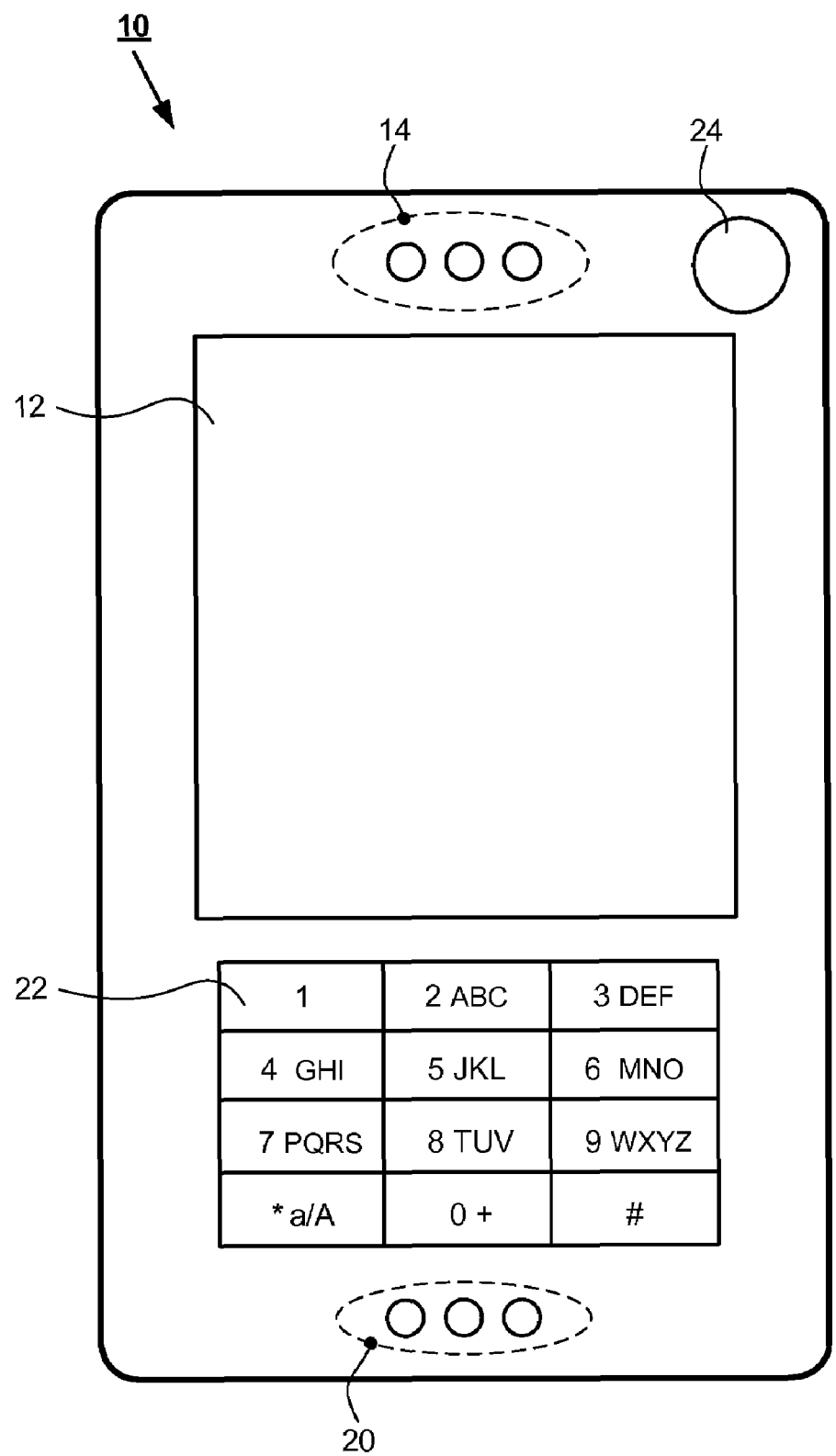
FIG. 1 shows an exemplary portable communication device in which systems and methods described herein may be implemented.

A portable communication device, such as phone 10 according to an implementation consistent with the principles of the invention is shown in FIG. 1. Phone 10 may include a display 12 and a keypad 22 including a set of keys. Keypad 22 may be used for entering information such as selection of functions and responding to prompts. Display 12 may be used for displaying functions and prompts to a user of phone 10.

Keypad 22 as shown in FIG. 1 comprises 3×4 keys, i.e., twelve keys. Several keys may correspond to at least two different (alphanumeric) symbols.

| Key | Symbol(s)/Character(s) |
| --- | --- |
| 1 | 1 |
| 2 | 2, A, B, C |
| 3 | 3, D, E, F |
| 4 | 4, G, H, I |
| 5 | 5, J, K, L |
| 6 | 6, M, N, O |
| 7 | 7, P, Q, R, S |
| 8 | 8, T, U, V |
| 9 | W, X, Y, Z |
| 10 | *, a/A |
| 11 | 0, + |
| 12 | # |

It should be emphasised that keypad 22 may be any suitable keypad, e.g., comprising push buttons or touch buttons or any other type of user input mechanism.

In addition, phone 10 may also include an antenna(e), which may be used for communication with other users via a network. However the antenna may be in-built in phone 10, and hence not shown in FIG. 1. Phone 10 may also include a speaker 14 for presenting sounds to a user, and/or a microphone 20 for sensing audible input from a user. Moreover, cell phone 10 may include a camera 24, e.g., a Charge-Coupled Device (CCD), for enabling pictures and/or movie shots to be recorded as data files. In particular, such an image data file may be provided with a file information field including the date when the data file was created, i.e., the year, month, day and/or the time when the data file was created. The file information field makes it possible to conveniently search for a particular image data file in a catalogue of image data files, as will be further discussed below.

At the outset, it should be appreciated that cellular phone 10 in FIG. 1 is just one example of a portable device in which the invention can be implemented. The invention can, for instance, also be used in a PDA (personal digital assistant), a palm top computer, a lap top computer, a smartphone, or any other suitable mobile device, e.g., such as a digital camera.

Figure 2:
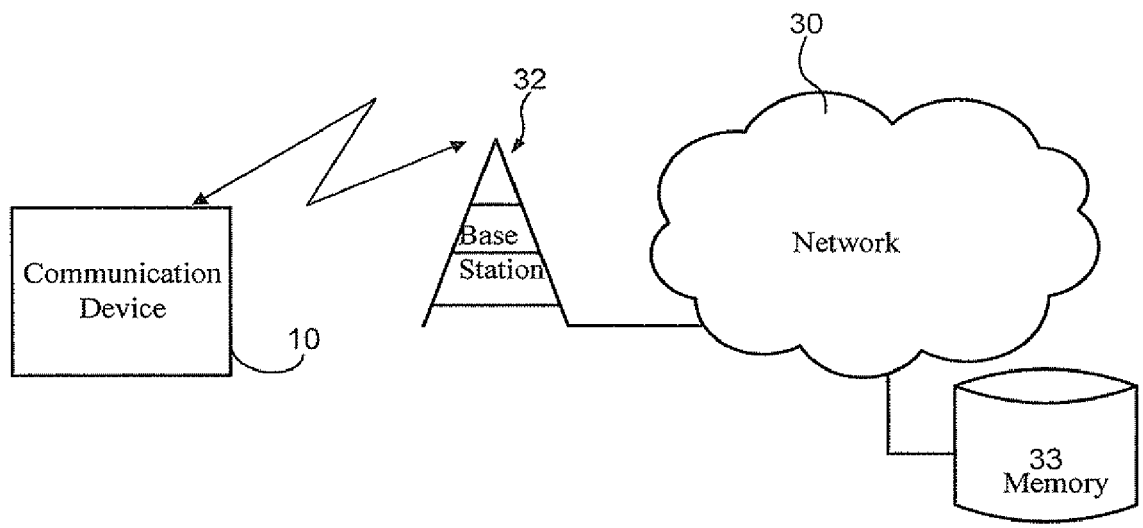
FIG. 2 shows an exemplary network system.

Referring now to FIG. 2, cellular phone 10 connects to a cellular network 30 via a base station 32. Network 30 may include a GSM or a GPRS network, or any other 2G, 2,5G or 2,75G network. Network may include a 3G network such as a WCDMA network. However, Network 30 does not have to be a cellular network but can be some type of network, such as Internet, a corporate intranet, a LAN or a wireless LAN. In addition, as can be seen in FIG. 2, an implementation of the present invention may utilize or comprise a memory arrangement 33 connected to said network 30. The memory arrangement 33 may e.g. be a server or similar connected to the Internet which in turn is connected to the network 30. Servers and other suitable memory arrangements being connected to the Internet is well known to those skilled in the art. A phone, like the phone 10, can be arranged to operatively access the Internet and resources such as servers and other memory arrangements connected thereto. This is common and well known in connection with GPRS and WCDMA networks and similar networks.

Figure 3:
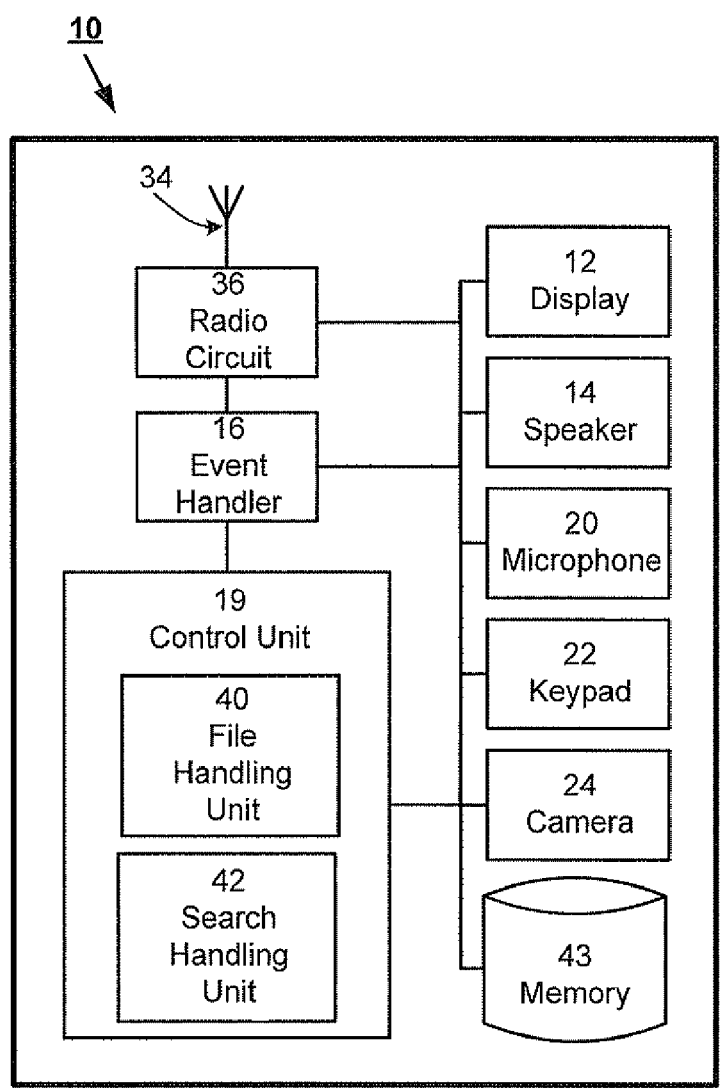
FIG. 3 shows a functional diagram of the portable communication device in FIG. 1.

FIG. 3 shows a functional diagram illustrating an exemplary phone 10. As previously explained, phone 10 may include display 12, speaker 14, microphone 20, keypad 22 and camera 24. In addition, phone 10 may be provided with a memory 43 for storing data files, in particular, searchable image data files produced by camera 24 and provided with a file information field including the date when the data file was created, as previously described above. Memory 43 may be any suitable memory type that may be used in portable devices.

In addition, phone 10 may include an antenna 34 that connects to a radio circuit 36 for enabling radio communication with network 30 in FIG. 2. Radio circuit 36 in turn may connect to an event handling unit 16 for handling such events as incoming and outgoing communication with external units via network 30, e.g., calls and messages, e.g., SMS (Short Message Service) and MMS (Multimedia Messaging Service).

Phone 10 may also be provided with a control unit 19 for controlling and supervising the operation of phone 10. Control unit 19 may be implemented by means of hardware and/or software, and it may include one or more hardware units and/or software modules, e.g., one or more processor units provided with or having access to the software and hardware appropriate for the functions performed by phone 10.

As can be seen in FIG. 3, control unit 19 may connect to display 12, speaker 14, event handling unit 16, microphone 20, keypad 22, camera 24, radio unit 36, and/or memory 43. This enables control unit 19 to control and communicate with connected units so as to, e.g., exchange information and instructions with the units.

In some implementations, control unit 19 may be provided with a file handling unit 40 for managing the data files stored in memory 43, for example, searchable data files stored therein. Furthermore, control unit 19 may be provided with a search handling unit 42 for searching and identifying a searchable data file, for example, as a response to key strokes received via keypad 22. As part of control unit 19, file handling unit 40 and the search handling unit 42 may be implemented by means of hardware and/or software, and they may include one or more hardware units and/or software modules, e.g., one or more processor units provided with or having access to the software and hardware appropriate for the functions performed. For example, file handling unit 40 may be implemented by means of an operative system running control unit 19 of phone 10, and search handling unit 42 may be implemented by a software program(s) running on control unit 19 under a suitable operative system.

It will be appreciated that, in addition to the modules shown in FIG. 3, further parts and units may be present in phone 10. The parts and units shown in FIG. 3 may also connect to more parts and units than that illustrated.

Turning now to the function of an exemplary implementation consistent with principles of the invention described with reference to the previously described FIGS. 1-3, FIG. 4 shows a flow chart of an exemplary method.

Phone 10 may, according to one implementation, be adapted to take pictures and to record movie shots by means of camera 24. Similarly, phone 10 may be preferably adapted to record voice conversations and other sounds by means of microphone 20. The resulting image files and audio files may be stored in the memory 43 by means of file handling unit 40 or in any other suitable memory arranged in phone 10. In addition, the files may be provided with file information fields, including the date on which the files were created or other identifying information. More particularly, the files may be provided with the date held by phone 10 at the time when the files were created. These functions can be found, for example, in the Sony Ericsson cellular phone, model K700i. Other file information fields uniquely identifying each of the stored files may be used.

As should be appreciated, the image files and audio files provided with associated dates are typical examples of searchable data files or data products. As an example, it can be mentioned that the Exchangeable Image File Format (EXIF) is used by most cameras. The EXIF is an image file format used for digital cameras, which format was created by the Japanese Electronic Industry Development Association (JEIDA). It is also realized by the observant reader having the benefit of this disclosure that the file-information fields can contain creation date and/or other information such as GPS location, modified date, album information, tagging information, etc. When entering a date tags, creation date or anything else that is relevant to the user. Also the search fields may be customizable.

The steps in an exemplary method of searching for such searchable data products stored in a portable device will now be described with reference to the exemplary flow chart in FIG. 4. The method may be implemented by means of search handling unit 42 utilizing file handling unit 46.

In a first step S1 of an exemplary method according to one implementation, the file information fields may be obtained for the image files stored in memory 43. The file information field may include the date and possibly also the time when the image files were created. The obtained file information fields may be presented to the user by means of display 12, or in any other suitable manner. A suitable part of the obtained file information fields may be presented to the user or only a suitable part of the file information fields may be obtained. A presentation of a suitable part of the file information fields is schematically illustrated in FIG. 5a showing an example in which the number of photos taken during each of the years 1999, 2003, 2004, and 2005 are displayed. The years 1999, 2003, 2004 and 2005 represent a part of the file information fields obtained in step S1 and, as can be seen, each such part comprises four positions. Other parts of the file information fields may include, e.g., the month, the day, and/or the time when the image file was created or filed.

In a second step S2 of the exemplary method, a pointer or other indicator (e.g., shading, blinking, highlighting, etc.) placed at the first divergent position in the obtained and presented file information fields. The "first divergent position" may denote the first position in which the file information fields comprise diverging information. In the example illustrated in FIG. 5a, the first divergent position is actually the first position in the presented file information fields, since 1999 begins with the symbol "1" and 2003-2005 begin with the symbol "2". Therefore, in this case, the pointer may be placed in the first position of the obtained and presented file information fields.

Before proceeding, it should be emphasised that the described method is an exemplifying implementation. How the user inputs dates and/or other information depends on the language settings of the phone 10, etc. For example, China, USA, and Europe use different protocols/formats for inputting dates. This can be customizable. In addition, the invention is not limited to files stored in the memory 43 of phone 10. To the contrary, the method of searching for searchable data products may also include an iterative query, e.g., sent for each key press to a database or similar storage device connected to the Internet. This allows for searching in even larger databases.

In a third step S3 processing may include determining whether all positions in the presented file information fields have been traversed of stepped through, i.e., whether the pointer has been positioned at the last position or possibly passed the last position in the presented file information fields. In addition, or alternatively, it can be determined whether only a single file is left. In either case, i.e., if all positions in the relevant file information fields have been stepped through and/or if the obtained and presented file information field corresponds to a single file, it may be concluded that the current search is exhaustive. The remaining file(s) can then be further processed as illustrated by step S7 in FIG. 4. Further processing may be, e.g., the display of the retrieved image comprised by an identified image file and/or playing the retrieved sound included in an identified audio file, etc. On the other hand, if all positions in the relevant file information fields have not been stepped through and the obtained file information fields correspond to more than one file, the method may proceed to the next step for the presented information field.

In a fourth step S4, a keystroke received from a user of phone 10 may be obtained via keypad 22 or other input device. This step may be characterized as a "waiting step", i.e., nothing may happen until an input is received, e.g., the user pushes a key on keypad 22. This and other unwanted or unexpected situations may be accounted for. Additional functionality may therefore be incorporated into the fourth step S4 or into the method as a whole, e.g., to allow a termination of a current step, or allowing the execution of other functions after a certain period of inactivity, or as a consequence of pushing a certain exit-button or a certain function-button, etc.

In a fifth step S5, the symbol(s) represented by the key pressed by a user of phone 10 may be compared to the symbol(s) comprised by the specific position in the file information fields on which the pointer is currently placed. If no match is found, the method may return to step four S4 to obtain a new keystroke from the user. However, if at least one match is found, the method may proceed for the presented file information field.

In a sixth step S6, the file information fields of the file(s) having a matching content may be obtained and presented. In other words, the file information fields that may be obtained and presented are those that have a symbol in the position indicated by the pointer that matches a symbol represented by the key pressed by the user. For example, in FIG. 5b, the user of phone 10 may have pressed the key representing the symbols "2, A, B, C" to select among the years presented in FIG. 5a. According to the method now discussed, this may result in the obtaining and presentation of the years 2003, 2004 and 2005 beginning with the symbol "2", whereas the year 1999 beginning with the symbol "1" may be omitted as non-selected. The method may then again proceed to the second step S2 of the exemplary method now discussed.

Figure 4:
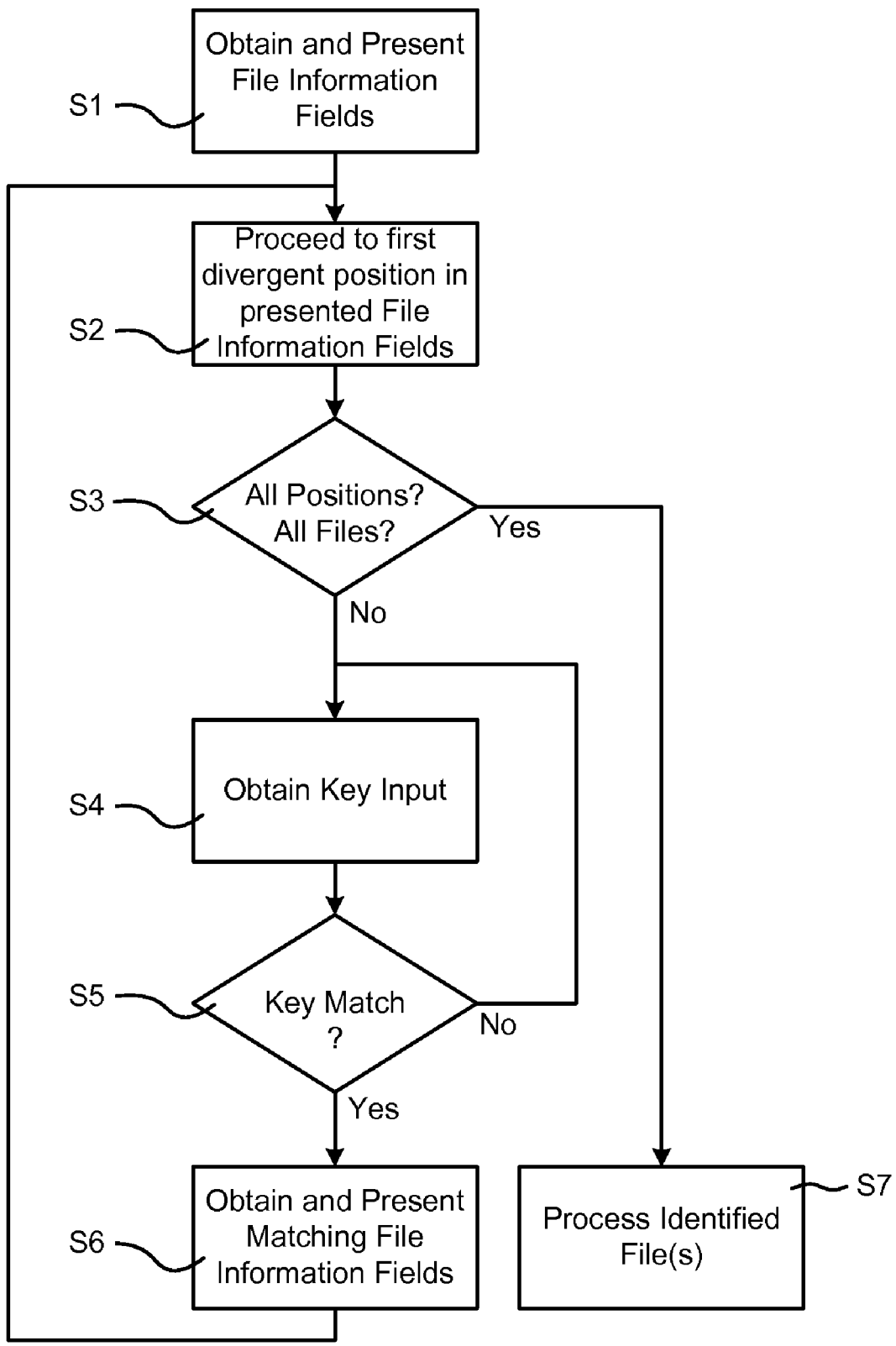
FIG. 4 shows a flow chart of a method of performing the method according to an implementation.

The exemplary method schematically illustrated by the flowchart in FIG. 4 will now be further elucidated by presenting an exemplary search for a certain image file among the image files retrieved in the first step S1 mentioned above.

As previously explained, in the second step S2, a pointer or other indicator may be placed at the first divergent position in the currently obtained and presented file information fields. In the example illustrated in FIGS. 5b and 5c, the first divergent position is the last position in the presented file information fields, since 2003-2005 ends with number or symbols "3", "4" and "5" respectively. Therefore, in this case, the pointer is placed in the last position of the currently presented file information fields. The "2" and the two proceeding symbols "0" in the presented file information fields 2003, 2004 and 2005 may be automatically provided, since the user is bound to key in these symbols in pursuing any of the choices, i.e., 2003; 2004; or 2005. This is illustrated in FIG. 5c, by the symbols "200" presented just above the word "year."

In FIG. 5d, the user of phone 10 may have pressed an additional key representing the symbols "5, J, K, L." This corresponds to a selection of the year 2005 having the symbol "5" in the position currently indicated by the pointer is presented, whereas the years 2003 and 2004 with the symbols "3" and "4", respectively, in said position, may be omitted as non-selected. As can be seen in FIG. 5d, further information comprised by the file information fields may now be obtained and presented by the exemplifying method now discussed. This information correspond to the months of 2005 during which photos, i.e., January, February, March, June, and December, as well as indication of the number of photos associated with each of these months. It should be appreciated that, this information may be presented initially, in FIG. 5a, provided that the display in question so permits and that this is suitable considering the intended use of the search method, etc.

As can be seen in FIG. 5e, the user of phone 10 may have again pressed the key representing the symbols "5, J, K, L." According to the exemplary method now discussed this may result in an obtaining and presentation of the months January and June, which correspond to the symbol "J" in the position indicated by the pointer, whereas the other months maybe omitted as non-selected.

In FIG. 5f, the user of phone 10 may have pressed the key representing the symbols "8, T, U, V." This input may correspond to a selection of the month June, which has the symbol "U" in the position currently indicated by the pointer. Again, as can be seen in FIG. 5f, further information comprised by the file information fields may than be obtained and presented by the exemplary method now discussed. This information comprises the days of the month June 2005 having associated stored images files, i.e., the days 1, 2, 4, 6, 7, 8, 9, 14, 20, 25, and 30.

In FIG. 5g, the user of phone 10 may have pressed the key representing the symbols "6, M, N, O." This may correspond to a selection of the 6$^{th}$ day of June 2005. Again, as can be seen in FIG. 5g, further information comprised by the file information fields is presented by the exemplary method now discussed. This information comprises times of day associated with the 6$^{th}$ day of June 2005 for which file images are stored, i.e., 0903, 2000, 2120, and 2212.

In FIG. 5h, the user of phone 10 may have pressed the key representing the symbols "2, A, B, C." This input may correspond to a selection of the time, 2212. According to the exemplary method now discussed, this may result in an obtaining and presentation of the time, 2212, having the symbol "2" in the position currently indicated by the pointer, starting from the right and proceeding to the left as will be explained shortly, whereas the other points in time may be omitted, as non-selected. Since the obtained and presented file information field may comprise a single point in time (i.e., 2212) this may correspond to a single image file. It may therefore be concluded that the search has been exhausted. The image file can then be further processed as illustrated by step S7 in FIG. 4. Further processing may, e.g., be the display of the retrieved image comprised by the image file obtained, presented, and identified.

In one implementation, the point in time (i.e., 2212) may be selected by letting the above-mentioned pointer start from the rightmost position so as to proceed to the left in the obtained and presented file information fields. This is an alternative to the above processing in which the pointer may start from the leftmost position so as to proceed to the right in the obtained and presented file information fields.

In fact, it may be preferred to change the direction of proceeding through presented file information fields based on the number of different symbols found in the first diverging position when proceeding from the leftmost or from the rightmost position in the presented file information fields. For example, in FIG. 5g, two different symbols (e.g., the symbols 0 and 2) may be found in the in the first diverging position when proceeding from the leftmost position (i.e., the leading digit in the time), whereas three different symbols (e.g. the symbols 0, 2, 3) may be found in the first diverging position when proceeding from the rightmost position (i.e., the ending digit in the time). It may then be preferred to proceed from the rightmost position. This has the potential of omitting a larger number of the presented file information fields, since it may be assumed that the symbols represented by a key pressed by a user in step five S5 as describe above will match a fewer number of the presented file-information-fields.

Figure 6:
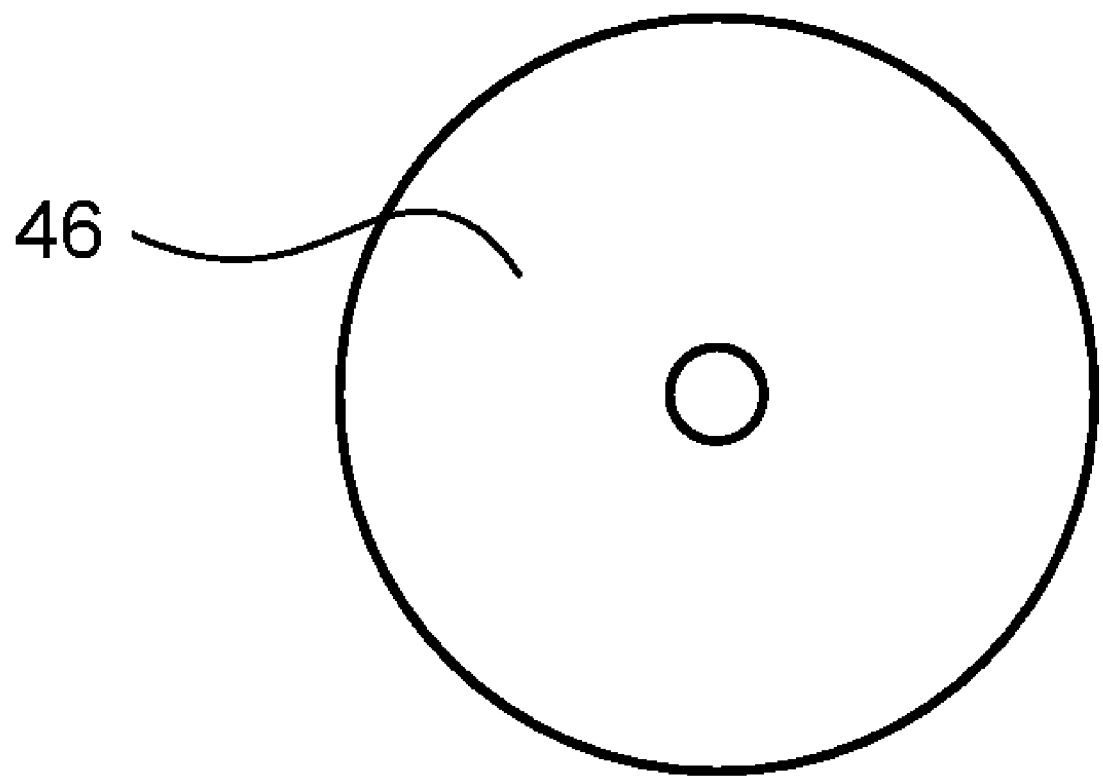
FIG. 6 shows a CD Rom on which program code for executing the method according to the invention may be provided.

In general, as previously explained, search handling unit 42 may be arranged to perform the exemplary method described above, as provided in the form of one or more processors with corresponding memory containing the appropriate software in the form of a program code. However, the program code can also be provided on a data carrier such as a CD ROM disc 46, as depicted in FIG. 6, or an insertable memory stick, which may perform the invention when loaded into a computer or into a phone having suitable processing capabilities. The program code can also be downloaded remotely from a server either outside or inside the cellular network or be downloaded via a computer, like a PC, to which the phone may be operatively connected.

The present invention has now been described with reference to exemplifying implementations. However, the invention is not limited to the implementations described herein. On the contrary, the full extent of the invention is only determined by the scope of the appended claims.

What is claimed is:

1. A method comprising:
   accessing a memory including a plurality of data files, wherein each of the data files includes a file information field containing a character string;
   retrieving, directly from the data files, at least a first part of the file information field associated with the data files;
   presenting the at least first part of the file information field via a display;
   identifying, among the character strings in the presented at least first part of the file information field, a character position for which the character associated with each of the data files has a common value;
   determining a first diverging character position among the character strings in the presented at least first part of the file information field, where the first diverging character position is adjacent to the identified character position;
   receiving, via an input device, an input corresponding to at least one symbol;
   comparing the at least one symbol to each of the characters in the first diverging character position;
   determining a number of characters that differ in a leftmost diverging character position and a right-most diverging character position in the character strings, wherein the determining the first diverging character position is performed beginning from the right-most diverging character position instead of the left-most diverging character position based on the number of different characters in the left-most diverging character position being fewer than the number of different characters in the right-most diverging character position; and
   presenting, based on a result of the comparing, at least a second part of the file information field associated with select ones of the data files which include a character, in the first diverging character position of the at least first part of the file information field, that matches the at least one symbol.

2. The method of claim 1, further comprising:
   repeating the determining, the receiving, the comparing, and the presenting until all positions in the character string in a presented file information field have been traversed or the presented file information field corresponds to one file.

3. The method of claim 1, wherein the file information field comprises a date on which a data file was created or filed.

4. The method of claim 1, wherein the at least one symbol comprises a numeral or a letter.

5. The method of claim 1, wherein determining the first diverging character position comprises automatically providing one or more characters preceding the first diverging character position when the one or more characters do not differ among the character strings.

6. The method of claim 2, further comprising processing the one file.

7. The method of claim 6, wherein the processing comprises displaying an image or a rendering a sound associated with the one file.

8. The method of claim 1, wherein the retrieving comprises accessing the memory residing in a portable device.

9. The method of claim 8, wherein the portable device is a phone.

10. The method of claim 1, wherein the retrieving comprises accessing the memory via a network.

11. A mobile device comprising:
   a keypad comprising a plurality of keys, each key corresponding to at least one symbol;
   a display for presenting information to a user; and
   logic to:
   access a memory storing a plurality of data files, each of the plurality of data files including a file information field comprising a string of characters;
   retrieve, directly from the plurality of data files, at least a first part of said file information fields;
   present the retrieved at least a first part of said file information fields; and search for at least one data file in said plurality of data files by:
   identifying, among the character strings in the presented first part of the file information fields, a character position for which the character associated with each of the data files has a common value,
   indicating a first diverging character position among the character strings in the presented first part of the file information fields, where the first diverging character position is adjacent to the identified character position,
   receiving a key input from the user,
   comparing the at least one symbol corresponding to the key input to a first character in each of the character strings corresponding to said first diverging character position, and
   presenting, based on a result of the comparing, at least a second part of the file information field associated with select ones of the data files having a character, in the first diverging character position of the at least first part of the file information field, that matches the at least one symbol,
   wherein the logic is further to indicate the first diverging character position from right-most to left-most in the character string in the presented first part of the file information field based on a number of different symbols in a first diverging position when proceeding from a left-most character or from a right-most character in the presented file information fields.

12. The mobile device in claim 11, wherein the logic is further to:
   repeat the retrieving, indicating, receiving, and comparing, and
   present an ultimate file information field until all positions in the character string in the presented ultimate file information field have been traversed or until the presented ultimate file information field corresponds to a single data file.

13. The mobile device of claim 11, wherein the file information field comprises a date on which the data file was created or filed.

14. The mobile device of claim 11, wherein the key input corresponds to a plurality of different symbols, each symbol being one of a numeral or a letter.

15. The mobile device of claim 11, wherein determining the first diverging character position comprises automatically providing one or more characters preceding the first diverging character position when the one or more characters do not differ among the character strings.

16. The mobile device of claim 11, wherein the logic is further to process an identified data file, when all positions in the presented file information fields have been traversed or when the presented file information field corresponds to a single data file.

17. The mobile device of claim 16, wherein the logic is further to cause an image, associated with the identified data file, or a sound, associated with the identified data file, to be played.

18. The mobile device of claim 11, wherein the memory resides in the mobile device.

19. The mobile device of claim 11, wherein the logic is further configured to access the memory via a network.

20. The mobile device of claims 11, wherein the mobile device is a phone.

* * * * *